US011235981B2

(12) United States Patent
Buri et al.

(10) Patent No.: US 11,235,981 B2
(45) Date of Patent: *Feb. 1, 2022

(54) PROCESS FOR THE PREPARATION OF AN AQUEOUS SOLUTION COMPRISING AT LEAST ONE EARTH ALKALI HYDROGEN CARBONATE AND ITS USE

(71) Applicant: Omya International AG, Oftringen (CH)

(72) Inventors: Matthias Buri, Rothrist (CH); Samuel Rentsch, Aarburg (CH); Patrick A. C. Gane, Rothrist (CH); René Vinzenz Blum, St. Urban (CH); Martine Poffet, Berne (CH)

(73) Assignee: OMYA INTERNATIONAL AG, Oftringen (CH)

( * ) Notice: Subject to any disclaimer, the term of this patent is extended or adjusted under 35 U.S.C. 154(b) by 299 days.

This patent is subject to a terminal disclaimer.

(21) Appl. No.: 15/281,935

(22) Filed: Sep. 30, 2016

(65) Prior Publication Data
US 2017/0036930 A1 Feb. 9, 2017

Related U.S. Application Data

(62) Division of application No. 14/366,060, filed as application No. PCT/EP2013/051881 on Jan. 31, 2013.

(Continued)

(30) Foreign Application Priority Data

Feb. 3, 2012 (EP) .................................. 12153905

(51) Int. Cl.
*C01F 5/24* (2006.01)
*C01F 11/18* (2006.01)
(Continued)

(52) U.S. Cl.
CPC ............ *C01F 11/185* (2013.01); *B01D 61/00* (2013.01); *C01F 5/24* (2013.01); *C01F 11/181* (2013.01);
(Continued)

(58) Field of Classification Search
CPC ...... B01D 61/14; B01D 61/16; B01D 61/145; B01D 61/147; B01D 2311/04;
(Continued)

(56) References Cited

U.S. PATENT DOCUMENTS 2,390,095 A * 12/1945 Gloss ........................ C01F 5/24
423/161
2,393,920 A * 1/1946 MacIntire ..................... 106/740
(Continued)

FOREIGN PATENT DOCUMENTS

AU 2010101085 A4 11/2010
EP 0520826 A1 12/1992
(Continued)

OTHER PUBLICATIONS

"Calcium Compounds, Survey," in ECT 3rd ed., vol. 4, pp. 421-426, by C. L. Rollinson, University of Maryland; in ECT 4th ed., vol. 4, pp. 787-796, by Richard L. Petersen and Mark B. Freilich, Memphis State University; posted on line Dec. 4, 2000, 11 pages. (Year: 2000).*

(Continued)

*Primary Examiner* — Benjamin L Lebron
(74) *Attorney, Agent, or Firm* — Fay Sharpe LLP (57) ABSTRACT

The present invention refers to a process for the preparation of an aqueous solution comprising at least one earth alkali hydrogen carbonate and its uses.

27 Claims, 2 Drawing Sheets

Related U.S. Application Data (60) Provisional application No. 61/597,196, filed on Feb. 10, 2012.

(51) Int. Cl.

| | | |
|---|---|---|
| *C02F 1/52* | (2006.01) | |
| *C02F 1/68* | (2006.01) | |
| *C09C 1/02* | (2006.01) | |
| *C02F 1/66* | (2006.01) | |
| *B01D 61/00* | (2006.01) | |
| *C02F 1/44* | (2006.01) | |
| *B01D 61/14* | (2006.01) | |
| *C02F 103/08* | (2006.01) | |

(52) U.S. Cl.
CPC .............. *C02F 1/444* (2013.01); *C02F 1/529* (2013.01); *C02F 1/66* (2013.01); *C02F 1/68* (2013.01); *C09C 1/021* (2013.01); *B01D 61/14* (2013.01); *C01P 2004/61* (2013.01); *C01P 2004/62* (2013.01); *C01P 2006/12* (2013.01); *C02F 2103/08* (2013.01); *C02F 2201/009* (2013.01); *C02F 2209/02* (2013.01); *C02F 2209/05* (2013.01); *C02F 2209/06* (2013.01); *C02F 2209/10* (2013.01); *C02F 2209/11* (2013.01); *C02F 2303/08* (2013.01); *C02F 2305/00* (2013.01); *Y02A 20/212* (2018.01); *Y02W 10/37* (2015.05)

(58) Field of Classification Search
CPC ............ B01D 2311/12; B01D 2311/24; B01D 2311/26; B01D 61/00; C02F 1/68; C02F 1/44; C02F 1/444; C02F 1/52; C02F 1/529; C02F 1/66; C02F 2103/08; C02F 2209/02; C02F 2209/05; C02F 2209/06; C02F 2303/08; C02F 2305/00; C02F 2201/009; C02F 2209/10; C02F 2209/11; C01F 5/24; C01F 11/18; C01F 11/181; C01F 11/185; C09C 1/021
See application file for complete search history.

(56) References Cited

U.S. PATENT DOCUMENTS

| | | | | |
|---|---|---|---|---|
| 2,455,813 | A * | 12/1948 | Schoenlaub | C01F 11/183 423/161 |
| 2,640,759 | A * | 6/1953 | Hughey | C01F 5/06 423/168 |
| 4,159,312 | A | 6/1979 | Shibazaki | |
| 4,210,626 | A | 7/1980 | Berrie et al. | |
| 4,244,933 | A | 1/1981 | Shibazaki | |
| 4,857,291 | A | 8/1989 | Ota | |
| 4,888,160 | A | 12/1989 | Kosin et al. | |
| 5,223,181 | A * | 6/1993 | Wilson | C01F 5/24 423/11 |
| 5,525,224 | A * | 6/1996 | Funahashi | C02F 5/02 210/205 |
| 5,879,442 | A * | 3/1999 | Nishiguchi | C01F 11/185 106/464 |
| 5,914,046 | A | 6/1999 | Watten | |
| 6,387,212 | B1 | 5/2002 | Christian | |
| 7,374,694 | B2 | 5/2008 | Gaudinot et al. | |
| 7,638,017 | B2 * | 12/2009 | Gane | |
| 7,771,599 | B1 | 8/2010 | Choi et al. | |
| 7,829,053 | B2 * | 11/2010 | Constantz | |
| 8,623,316 | B2 | 1/2014 | Engsl | |
| 8,721,838 | B2 * | 5/2014 | Buri | C09C 1/021 162/164.7 |
| 10,221,077 | B2 * | 3/2019 | Buri | C02F 1/529 |
| 2003/0045647 | A1 * | 3/2003 | Suau | B01F 17/0028 525/329.7 |
| 2004/0104180 | A1 * | 6/2004 | Gaudinot | A23L 2/54 210/749 |
| 2005/0255174 | A1 * | 11/2005 | Shelley | A61K 33/10 424/686 |
| 2006/0275203 | A1 † | 12/2006 | Chavez | |
| 2007/0202032 | A1 * | 8/2007 | Geerlings | C01F 5/24 423/419.1 |
| 2007/0287758 | A1 * | 12/2007 | Ricaud | B82Y 30/00 516/88 |
| 2010/0074827 | A1 * | 3/2010 | Rainer | |
| 2010/0282127 | A1 | 11/2010 | Gerard et al. | |
| 2010/0282688 | A1 † | 11/2010 | Pust | |
| 2011/0132840 | A1 * | 6/2011 | Choi | B01D 61/025 210/638 |
| 2011/0269887 | A1 * | 11/2011 | Gane | C09C 1/021 524/425 |
| 2011/0297043 | A1 * | 12/2011 | Gane | |
| 2012/0142965 | A1 * | 6/2012 | Gane | |
| 2013/0174994 | A1 * | 7/2013 | Buri | |
| 2014/0014582 | A1 * | 1/2014 | Muro | B01D 61/142 210/638 |
| 2014/0209544 | A1 | 7/2014 | Poffet et al. | |
| 2015/0037463 | A1 * | 2/2015 | Skovby | C01B 5/00 426/66 |

FOREIGN PATENT DOCUMENTS

| | | | |
|---|---|---|---|
| EP | 1080039 | B1 † | 3/2001 |
| EP | 2418177 | A1 | 2/2012 |
| EP | 2548848 | A1 | 1/2013 |
| JP | 57184430 | A | 11/1982 |
| JP | 60206489 | A | 10/1985 |
| JP | 6227325 | A | 2/1987 |
| JP | 05293476 | A | 11/1993 |
| JP | 2002173323 | * | 6/2002 |
| JP | 2002173323 | A | 6/2002 |
| JP | 2008043868 | A | 2/2008 |
| WO | 03086973 | A1 | 10/2003 |
| WO | 2006008242 | A1 | 1/2006 |
| WO | 2007031869 | A1 | 3/2007 |
| WO | 2007031870 | A1 | 3/2007 |
| WO | 2007071633 | A1 | 6/2007 |
| WO | 2008113842 | A1 | 9/2008 |
| WO | 2010012691 | A1 | 2/2010 |
| WO | WO2010063757 | * | 6/2010 |
| WO | 2010097449 | A1 | 9/2010 |
| WO | 2010107320 | A1 | 9/2010 |
| WO | 2013113807 | A1 | 8/2013 |

OTHER PUBLICATIONS

Global CCS, "Accelerating the uptake of CCS: Industrial use of captured carbon dioxide," Mar. 2011, 279 pages. (Year: 2011).*
USGS, "2009 Minerals yearbook: Lime," Aug. 2011, p. 1-15. (Year: 2011).*
Machine translation of JP2002173323, originally published Jun. 21, 2002. (Year: 2002).*
Voutchkov, Nikolay. Re-mineralization of desalinated water. SunCam. 2011, p. 1-43. (Year: 2011).*
Office Action dated Jun. 19, 2015 for Australian Application No. 2013214263.
Office Action dated Aug. 6, 2015 for Singapore Application No. 11201403577Y.
Office Action dated Mar. 31, 2016 for Arab Application No. GC 2013-23482.
Office Action dated Jun. 2, 2015 for Canadian Application No. 2,859,585.
Office Action for Chile Application No. 1941-14.
Office Action dated Oct. 6, 2015 for Japanese Application No. 2-14-555200.
Office Action dated May 20, 2015 for Chinese Application No. 201380007681.8.
Office Action dated May 6, 2016 for Korean Application No. 10-201407021643.
Office Action for Eurasian Application No. 201491458/28.

(56) References Cited

OTHER PUBLICATIONS

Notification to Grant dated Mar. 18, 2016 for Russian Application No. 201491458.
European Search Report dated Jul. 13, 2012 for Application No. 12153898.7.
The International Search Report dated Apr. 17, 2013 for PCT/EP2013/051881.
The Written Opinion of the International Searching Authority dated Apr. 17, 2013 for PCT/EP2013/051881.
Facts and Ground for Opposition against Patent EP2809618 B1.
Geldenhuys et al. "An integrated limestone/lime process for partial sulphate removal." The Journal of The South African Institute of Mining and Metallurgy, Jul./Aug. 2003.
GUDE "Conditioning of Aggressive Water." Faculty of Civil Engineering and Geosciences—Delft University of Technology, Oct. 15, 2010.
Screen shot of the University of Delft webpage at http://repository.tudelft.nl/islandora/object/uuid:934d99e5-526e-4067-bdd2-7982d406D15c?collection=education.
Screen shot of google search.
Declaration of Mr. Gude dated May 4, 2017.
Queensland Government: "Interpretation of Water Results." Standard Water Analyses (SWA) dated Oct. 25, 2010.
Hasson et al. "Modeling remineralization of desalinated water by limestone dissolution." Desalination 190 (2006) 189-200.
Ruggieri et al. "Limestone selection criteria for EDR water remineralization." Desalination 227 (2008) 314-326.
De Souza et al. "An evaluation of the suitability of the limestone based sidestream stabilisation process for stabilization of waters of the lesotho highlands scheme." Paper presented at the Biennial Conference of the Water Institute of Southern Africa (WISA), May 19-23, 2002, Durban, South Africa.
J.M. Huber Corporation—Calcium Carbonate Powder—data sheet HuberCal150 and 950.
Withers "Options for recarbonation, remineralisation and disinfection for desalination plants." Desalination 179 (2005) 11-24.
Gude et al. "Micronized CaCO3: a feasible alternative to limestone filtration for conditioning and (re)mineralization of drinking water?" Dec. 2011 Journal of Water Supply: Research & Technology—AQUA, vol. 60, issue 8, p. 469.
Notice of Opposition to a European Patent dated Nov. 23, 2016 for Patent No. EP 2809618.
Green et al.—Perry's Chemical Engineers' Handbook, 8th Edition, McGraw Hill (2008) p. 18-149-18-150.
Office Action dated Jan. 8, 2018 for Indian Patent Application No. 1412/MUMNP/2014.
Office Action dated Apr. 10, 2017 for Indonesian Patent Application No. P00201404603.
Office Action dated May 22, 2017 for Israeli Patent Application No. 233349.
Liat Birnhack, et al.; "Fundamental Chemistry and Engineering Aspects of Post-Treatment Processes for Desalinated Water—A Review": Article; 18 pages; httpy/www.elsevier/locate/desal; Desalination; The International Journal of the Science and Technology of Desalting and Water Purification; vol. 273; Issue 1; Jun. 1, 2011; ISSN: 0011-9164; http://www.elsevier.com/copyright.†
Isabelle Dubois et al.;Dependency of BET surface area on particle size for some granitic mineral; Article; Jan. 2011; 9 pages; http://www.researchgate.net/publication/258642352.†
J.C.J. Gude et al.; Micronized CaCO3: a feasible alternative to limestone filtration for conditioning and (re) mineralization of drinking water?; 12 pages; Publication Date Dec. 2011 Journal of Water Supply: Research and Technology—AQUA; vol. 60, Issue 8; http://aqua.iwaponline.com/content/60/8/649.†
A.J. Geldenhuys et al.; "An Integrated Limestone/Lime Process for Partial Sulphate Removal"; Article; 10 pages; The Journal of the South African Institute of Mining and Metallurgy; Jul.-Aug. 2003; copyright The South African Institute of Mining Metallurgy, 2003; SA ISSN0038-223X/3.00 + 0.00. Paper received May 2009; revised Mar. 2003.†

\* cited by examiner
† cited by third party

PROCESS FOR THE PREPARATION OF AN AQUEOUS SOLUTION COMPRISING AT LEAST ONE EARTH ALKALI HYDROGEN CARBONATE AND ITS USE

CROSS-REFERENCE TO RELATED APPLICATIONS

This is a divisional of U.S. application Ser. No. 14/366,060, filed Jun. 17, 2014, which is a U.S. National phase of PCT Application No. PCT/EP2013/051881, filed Jan. 31, 2013, which claims priority to European Application No. 12153905.0, filed Feb. 3, 2012 and U.S. Provisional Application No. 61/597,196, filed Feb. 10, 2012, the contents of which are hereby incorporated by reference.

The invention relates to the field a process producing aqueous earth alkali hydrogen carbonate solution and the use of such solutions.

Calcium carbonate is used extensively in the paper industry as a filler component in paper. It is a low cost, high brightness filler used to increase sheet brightness and opacity. Its use has increased dramatically in the last decades due to the conversion from acid to alkaline papermaking at paper mills. Both natural and synthetic calcium carbonates are used in the paper industry. Natural carbonate, or limestone, is ground to a small particle size prior to its use in paper, while synthetic calcium carbonate is manufactured by a precipitation reaction and is therefore called precipitated calcium carbonate (PCC).

Besides its use in the papermaking industry, precipitated calcium carbonate is also used for various other purposes, e.g. as filler or pigment in the paint industries, and as functional filler for the manufacture of plastic materials, plastisols, sealing compounds, printing inks, rubber, toothpaste, cosmetics, food, pharmaceuticals etc.

Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as diverse assortment of thin elongated prismatic, curved bladed, steep pyramidal, chisel shaped crystals, branching tree, and coral or wormlike form.

Usually, PCC is prepared by introducing $CO_2$ into an aqueous suspension of calcium hydroxide, the so-called milk of lime $$Ca(OH)_2 + CO_2 \rightarrow CaCO_3 + H_2O.$$

There are numerous patent applications known to the person skilled in the art that describe the preparation of precipitated calcium carbonate. One of them is EP 1 966 092 B1, where the obtained precipitated calcium carbonate is only a by-product of the sequestration of $CO_2$. Another one is WO 2010/12691, this document disclosing the production of PCC by the addition of an earth alkali hydroxide to water that contains earth alkali ions.

International Patent Application WO 2006/008242 A1, for example, describes the production of high purity calcium carbonate or magnesium carbonate from a feedstock comprising a Ca- or Mg-comprising mixed metal oxide, wherein the feedstock is contacted with a $CO_2$ containing gas in order to sequestrate the $CO_2$ and in a further step the high purity calcium carbonate or magnesium carbonate is precipitated from the aqueous solution that resulted from contacting the feedstock with the $CO_2$.

In addition to the above-mentioned fields, calcium carbonate can also be used in the field of the treatment and mineralization of water.

Drinking water has become scarce. Even in countries that are rich in water, not all sources and reservoirs are suitable for the production of drinking water, and many sources of today are threatened by a dramatic deterioration of the water quality. Initially feed water used for drinking purposes was mainly surface water and groundwater. However the treatment of seawater, brine, brackish waters, waste waters and contaminated effluent waters is gaining more and more importance for environmental and economic reasons.

In order to recover water from seawater or brackish water, for potable usages, several processes are known, which are of considerable importance for dry areas, coastal regions and sea islands, and such processes comprise distillation, electrolytic as well as osmotic or reverse osmotic processes. The water obtained by such processes is very soft and has a low pH value because of the lack of pH-buffering salts, and thus, tends to be highly reactive and unless treated, it can create severe corrosion difficulties during its transport in conventional pipelines. Furthermore, untreated desalinated water cannot be used directly as a source of drinking water. To prevent the dissolution of undesirable substances in pipeline systems, to avoid the corrosion of water works such as pipes and valves and to make the water palatable, it is necessary to mineralize the water.

Conventional processes that are mainly used for the mineralization of water are lime dissolution by carbon dioxide and limestone bed filtration. Other, less common remineralization processes, comprise, e.g., the addition of hydrated lime and sodium carbonate, the addition of calcium sulfate and sodium bicarbonate, or the addition of calcium chloride and sodium bicarbonate.

The lime process involves treatment of lime solution with $CO_2$ acidified water, wherein the following reaction is involved:

$$Ca(OH)_2 + 2CO_2 \rightarrow Ca^{2+} + 2HCO_3^-$$

As can be gathered from the above reaction scheme, two equivalents of $CO_2$ are necessary to convert one equivalent of $Ca(OH)_2$ into $Ca^{2+}$ and bicarbonate for remineralization. This method is dependent on the addition of two equivalents of $CO_2$ in order to convert the alkaline hydroxide ions into the buffering species $HCO_3^-$. For the remineralization of water, a saturated calcium hydroxide solution, commonly named lime water, of 0.1-0.2 wt.-% based on the total weight, is prepared from a lime milk (usually at most 5 wt.-%). Therefore, a saturator to produce the lime water must be used and large volumes of lime water are necessary to achieve the target level of remineralization. A further drawback of this method is that hydrated lime is corrosive and requires appropriate handling and specific equipment. Furthermore, a poorly controlled addition of hydrated lime to the soft water can lead to unwanted pH shifts due to the absence of buffering properties of lime.

The limestone bed filtration process comprises the step of passing the soft water through a bed of granular limestone dissolving the calcium carbonate in the water flow. Contacting limestone with $CO_2$ acidified water mineralizes the water according to:

$$CaCO_3 + CO_2 + H_2O \rightarrow Ca^{2+} + 2HCO_3^-$$

Unlike the lime process, only one equivalent of $CO_2$ is stochiometrically necessary to convert one equivalent of $CaCO_3$ into $Ca^{2+}$ and bicarbonate for remineralization. Moreover, limestone is not corrosive and due to the buffering properties of $CaCO_3$ major pH shifts are prevented.

One additional advantage of the use of calcium carbonate compared to lime is its very low carbon dioxide footprint. In order to produce one tonne of calcium carbonate 75 kg of $CO_2$ is emitted, whereas 750 kg of $CO_2$ is emitted for the production of one tonne of lime. Therefore, the use of earth alkali carbonates such marble, dolomite or only have burned dolomite instead of lime presents some environmental benefits.

The dissolution rate of granular calcium carbonate, however, is slow and filters are required for this process. This induces a sizeable footprint of these filters and large plant surfaces are required for the limestone bed filtration systems.

Methods for remineralization of water using lime milk or a slurry of lime are described in U.S. Pat. No. 7,374,694 and EP 0 520826. U.S. Pat. No. 5,914,046 describes a method for reducing the acidity in effluent discharges using a pulsed limestone bed.

WO 2010/12691 discloses a process for the treatment of water containing at least calcium and/or magnesium salts through membranes of reverse osmosis typ. The process comprises at least one step of recovering water that is at least partly desalinated, a step of recovering a concentrate originating from the membranes and that contains bicarbonates, a step of injecting $CO_2$ or an acid into the at least partially desalinated water, and a step of remineralization of the at least partially desalinated water. The $CO_2$ is added to the bicarbonate solution in order to decarbonate the concentrate and to form agglomerates of calcium carbonates out of the bicarbonates.

The applicant also knows the following unpublished European Patent Applications in the field of water treatment.

European Patent Application 11 175 012.1 describes a method for the remineralization of desalinated and fresh water containing a certain carbon dioxide level by injecting a micronized calcium carbonate slurry in feed water.

European Patent Application 10 172 771.7 describes a method for the remineralization of desalinated and fresh water by injecting a micronized calcium carbonate slurry.

Finally, European Patent Application 11 179 541.5 describes a method for the remineralization of water by combining a calcium carbonate solution and feed water.

In the three unpublished European Patent Applications of the field of water treatment no indication is given about the specific surface area (SSA) of the earth alkali carbonates used. From the mean particle size referred to in the examples of these patent applications it is not possible to calculate the specific surface area (SSA) of the corresponding products. No indication is given with regard to the influence of the specific surface area (SSA) on an efficient production of an earth alkali hydrogen carbonate solution.

SUMMARY OF INVENTION

Thus, considering the drawbacks of the known processes for mineralization or remineralization of water, it is the object of the present invention to provide an alternative and improved process for mineralization of water.

Another object of the present invention is to provide a process for mineralization of water that does not require a corrosive compound, and thus, avoids the danger of incrustation, eliminates the need for corrosion resistant equipment, and provides a safe environment for people working in the plant. It would also be desirable to provide a process that is environmental friendly and requires low amounts of carbon dioxide when compared to today's water remineralization with lime processes.

Another object of the present invention is to provide a process for mineralization of water, wherein the amount of minerals can be adjusted to the required values.

BRIEF DESCRIPTION OF DRAWINGS

FIG. 1: Illustration of a process according to the present invention. A reactor system that comprises a tank (1) that is equipped with a stirrer (2), at least one inlet (not shown) for the water, the carbon dioxide and the at least substance comprising at least one earth alkali carbonate and the optional at least one earth alkali hydroxide as well as a pH measuring device (not shown). The at least one substance comprising at least one earth alkali carbonate and the optional at least one earth alkali hydroxide in a minor amount in respect to earth alkali carbonate can be introduced into the tank either in a dry or in an aqueous form. Connected to the reactor, there is at least one filtering device (4) that has an outlet for the aqueous solution comprising at least one earth alkali hydrogen carbonate. When there is more than one filtering device present, then they can be either arranged in a parallel, or an in-line (serial), or a parallel and an in-line manner. The filtering device (4) is preferably a membrane filter. The filtering device (4) is connected to the tank (1) in such a way that a recirculation of a part of the suspension from the filtering device (4) into the tank (1) is possible, if required. The at least one substance comprising at least one earth alkali carbonate and the optional at least one earth alkali hydroxide (6) in a minor amount in respect to earth alkali carbonate, the water (14) and the $CO_2$ are introduced into the tank (1) via the at least one inlet (not shown) and are stirred with stirrer (2) in order to obtain the resulting suspension S having a pH of between 6 and 9. Then, the resulting suspension S is fed (8) to the filtering device (4), where coarse particles, i.e. all particles having a size of at least 0.2 µm, that are contained in the suspension are retained in the filtering device (4), and a clear aqueous solution comprising at least one earth alkali hydrogen carbonate is obtained. At least a part of the clear aqueous solution comprising at least one earth alkali hydrogen carbonate is discharged (10) from the filtering device (4). The flow rate of the suspension S through the filtering device (4) is at least 1 m/s, and preferably in the range of 1.5 to 10 m/s, and most preferably in the range of 3 to 6 m/s. Optionally, further treatments (16) can be carried out, such as for example a mechanical treatment or the addition of biocides or other additives in order to change the pH of the solution (e.g. addition of a base such as NaOH), the conductivity of the solution, or the hardness of the solution. As a further option, the clear aqueous solution comprising at least one earth alkali hydrogen carbonate discharged from the filtering device can be diluted with further water (14). The coarse particles contained in the suspension and that are retained in the filtering device can optionally be recirculated (12) to the reactor in order to be available for further conversion.

DETAILED DESCRIPTION OF THE INVENTION

The foregoing and other objects are solved by the provision of a process for the preparation of an aqueous solution comprising at least one earth alkali hydrogen carbonate, the process comprising the steps of:

a) providing water,
b) providing at least one substance comprising at least one earth alkali carbonate and optionally at least one earth alkali hydroxide in a minor amount in respect to earth alkali carbonate, the at least one substance being in a dry form or in an aqueous form,
c) providing $CO_2$,
d) combining either:
   (i) the water of step a), the at least one substance comprising at least one earth alkali carbonate and the optional at least one earth alkali hydroxide of step b) and the $CO_2$ of step c), or
   (ii) the water of step a) and the at least one substance comprising at least one earth alkali carbonate and the optional at least one earth alkali hydroxide of step b) in order to obtain an alkaline aqueous suspension of the at least one substance comprising at least one earth alkali carbonate and the optional at least one earth alkali hydroxide, and subsequently combining the alkaline aqueous suspension with the $CO_2$ of step c)
   in order to obtain a resulting suspension S having a pH of between 6 and 9, the resulting suspension S containing particles,
e) filtering at least a part of the resulting suspension S that is obtained in step d) by passing the resulting suspension S through a filtering device in order to obtain the aqueous solution comprising at least one earth alkali hydrogen carbonate,
wherein the particles of the resulting suspension S that is obtained in step d) represent a total particle surface area ($SSA_{total}$) that is >20 000 m²/tonne of the resulting suspension S, and
with the proviso that an addition of the $CO_2$ of step c) does not take place before an addition of the at least one substance comprising at least one earth alkali carbonate and the optional at least one earth alkali hydroxide of step b).

When the specific surface area (SSA) of the substance comprising at least one earth alkali carbonate and the optional at least one earth alkali hydroxide is known, then the total particle surface of the alkaline aqueous suspension of step d) can be easily adjusted. Alternatively, the specific surface area of the substance comprising at least one earth alkali carbonate and the optional at least one earth alkali hydroxide has to be determined by the method that is known to the person skilled in the art and that is laid down in Standard ISO 9277.

According to another aspect of the present invention, use of an aqueous solution comprising at least one earth alkali hydrogen carbonate for the production of a precipitated earth alkali carbonate, and in particular for the production of a precipitated calcium carbonate is provided.

According to further aspect of the present invention, use of an aqueous solution comprising at least one earth alkali hydrogen carbonate for the mineralization of water is provided.

Yet to another aspect of the present invention there is a process for the mineralization of water provided, the process comprising the following steps:
I) providing feed water,
II) providing an aqueous solution comprising at least one earth alkali hydrogen carbonate, and
III) combining the feed water of step I) and the aqueous solution comprising at least one earth alkali hydrogen carbonate of step II) in order to obtain mineralized water.

Yet another aspect of the invention is a process for the production of a precipitated earth alkali carbonate, the process comprising the following steps:

IV) providing an aqueous solution comprising at least one earth alkali hydrogen carbonate, and
V) heating the aqueous solution comprising at least one earth alkali hydrogen carbonate of step IV) in order to obtain the precipitated earth alkali carbonate and/or
VI) adding at least one earth alkali hydroxide or earth alkali oxide to the solution of step IV) to obtain the precipitated earth alkali carbonate.

Advantageous embodiments of the present invention are defined in the corresponding sub-claims.

According to one embodiment of the present invention, the particles of the resulting suspension S represent a total particle surface area ($SSA_{total}$) that is in the range of 25 000-5 000 000 m²/tonne, more preferably in the range of 50 000-2 000 000 m²/tonne, most preferably in the range of 200 000-600 000 m²/tonne of the resulting suspension S.

The term "specific surface area (SSA)" in the meaning of the present invention describes the material property of pigments/minerals/solids that measures the surface area per gram of pigments. The unit is m²/g.

The term "total particle surface area ($SSA_{total}$)" in the meaning of the present invention describes the total surface area per tonne of suspension S.

According to another embodiment, the at least one substance comprising at least one earth alkali carbonate and the optional at least one earth alkali hydroxide of step b) is selected from the group comprising marble, limestone, chalk, half burnt lime, burnt lime, dolomitic limestone, calcareous dolomite, half burnt dolomite, burnt dolomite, and precipitated earth alkali carbonates such as precipitated calcium carbonate, for example of calcitic, aragonitic and/or vateritic mineral crystal structure, for example from water de-hardening by the addition of $Ca(OH)_2$. The use of marble, limestone, chalk and dolomite is preferred because they are naturally occurring minerals and the turbidity of the final drinking water quality is guaranteed by using a clear aqueous solution comprising at least one earth alkali hydrogen carbonate that is produced using these naturally occurring minerals. Natural marble deposits are mostly containing acid and/or water insoluble silicate impurities. However, such acid and/or water insoluble, sometimes colored silicates do not affect the final water quality with respect of turbidity when using the product that is prepared by the inventive process.

In addition, suspensions or solutions prepared by using naturally occurring minerals such as marble, limestone, chalk or dolomite are containing essential healthy trace elements improving the quality of drinking water.

The at least one earth alkali hydroxide is preferably calcium hydroxide and/or magnesium hydroxide. Due to the fact of very low solubility of $Mg(OH)_2$ in water compared to $Ca(OH)_2$ the speed of reaction of $Mg(OH)_2$ with $CO_2$ is very limited and in presence of $Ca(OH)_2$ in suspension the reaction of $CO_2$ with $Ca(OH)_2$ is very much preferred. Surprisingly, by using the inventive process it is possible to produce $Mg(HCO_3)_2$ rich earth alkali hydrogen carbonate suspension also in presence of $Ca(OH)_2$ in the suspension.

According to yet another embodiment the at least one substance comprising at least one earth alkali carbonate and the optional at least one earth alkali hydroxide of step b) has a weight median particle size ($d_{50}$) in the range of 0.1 μm to 50 μm, and preferably in the range of 0.5 μm to 5 μm.

The at least one substance comprising at least one earth alkali carbonate and the optional at least one earth alkali hydroxide of step b) has preferably a specific surface area (SSA) in the range of 0.01 to 200 m²/g, and more preferably in the range of 1 to 100 m²/g.

In a preferred embodiment of the present invention, the at least one substance comprising at least one earth alkali carbonate and the optional at least one earth alkali hydroxide of step b) has a hydrochloric acid (HCl) insoluble content from 0.02 to 90 wt.-%, preferably from 0.05 to 15 wt.-%, based on the total weight of the dry substance. The HCl insoluble content may be, e.g., minerals such as quartz, silicate, mica a/o pyrite.

According to yet another embodiment of the present invention, the resulting suspension S that is obtained in step d) has a solids content in the range from 0.1 to 80 wt.-%, preferably in the range of 3 to 50 wt.-%, more preferably in the range of 5 to 35 wt.-%, based on the total weight of the resulting suspension S.

The water of step a) is preferably selected from distilled water, tap water, desalinated water, brine, treated wastewater or natural water such as ground water, surface water or rainfall.

According to one embodiment of the present invention the $CO_2$ is selected from gaseous carbon dioxide, liquid carbon dioxide, solid carbon dioxide or a gaseous mixture of carbon dioxide and at least one other gas, and is preferably gaseous carbon dioxide. When the $CO_2$ is a gaseous mixture of carbon dioxide and at least one other gas, then the gaseous mixture is a carbon dioxide containing flue gas exhausted from industrial processes like combustion processes or calcination processed or alike. $CO_2$ can also be produced by reacting an alkali- and/or earth alkali carbonate with acid. When a gaseous mixture of carbon dioxide and at least one other gas is used, then the carbon dioxide is present in the range of 8 to about 99% by volume, and preferably in the range of 10 to 25% by volume, for example 20% by volume. According to a very preferred embodiment, the $CO_2$ is pure gaseous $CO_2$ with a purity of >99%, e.g. a purity of >99.9%.

In the light of an ecological concept, it is desirable to follow as far as possible the Kyoto protocol on the reduction of combustion of petrochemical sources and to reduce petrochemical derived $CO_2$ so that the $CO_2$ used for the process has a $^{14}C$ to $^{12}C$ decay of at least 500, more preferred at least 800, most preferred at least 900 decay per h and per g of C in the $CO_2$.

Following the Kyoto protocol, it is also desirable that the electrical power used in the process of the present invention is derived from solar power, for example from thermal and/or voltammetry solar panels.

In a further preferred embodiment of the present invention following the Kyoto protocol, the amount of $CO_2$ used, in mol, to produce 1 mol of the at least one earth alkali hydrogen carbonate in the aqueous solution is in the range of only 0.5 to 4 mol, preferably in the range of only 0.5 to 2.5 mol, more preferably in the range of only 0.5 to 1.0 mol, and most preferably in the range of only 0.5 to 0.65 mol.

According to another preferred embodiment of the invention the aqueous solution comprising at least one earth alkali hydrogen carbonate that is obtained in step e) has a hardness from 5 to 130° dH, preferably from 10 to 60° dH, and most preferably from 15 to 50° dH.

For the purpose of the present invention the hardness refers to the German hardness and is expressed in "degree German hardness, ° dH". In this regard, the hardness refers to the total amount of earth alkali ions in the aqueous solution comprising the earth alkali hydrogen carbonate, and it is measured by complexometric titration at pH 10 using ethylene-diamine-tetra-actetic acid (EDTA) and Eriochrome T as equivalent point indicator.

The aqueous solution comprising at least one earth alkali hydrogen carbonate and that is obtained in step e) has preferably a pH in the range of 6.5 to 9, preferably in the range of 6.7 to 7.9, and most preferably in the range of 6.9 to 7.7, at 20° C.

According to one embodiment of the present invention, the aqueous solution comprising at least one earth alkali hydrogen carbonate and that is obtained in step e) has a calcium concentration from 1 to 700 mg/l, preferably from 50 to 650 mg/l, and most preferably from 70 to 630 mg/l. According to another embodiment the aqueous solution comprising at least one earth alkali hydrogen carbonate and that is obtained in step e) or optional step f) has a magnesium concentration from 1 to 200 mg/l, preferably from 2 to 150 mg/l, and most preferably from 3 to 125 mg/l.

According to still another embodiment of the present invention the aqueous solution comprising at least one earth alkali hydrogen carbonate and that is obtained in step e) has a turbidity value of lower than 1.0 NTU, preferably of lower than 0.5 NTU, and most preferably of lower than 0.3 NTU.

It is preferred that at least step d) is carried out at a temperature that is in a range of 5 to 55° C., and preferably in a range of 20 to 45° C.

According to an even more preferred embodiment of the present invention the aqueous solution obtained in step e) comprises:
(x) a calcium hydrogen carbonate, preferably with a calcium concentration of 25 to 150 mg/l, as calcium carbonate, or
(xx) a magnesium hydrogen carbonate, preferably with a magnesium concentration of >0 to 50 mg/l, or
(xxx) a mixture of a calcium and a magnesium hydrogen carbonate, preferably in a total calcium and magnesium concentration of 25 to 200 mg/l, as calcium carbonate and magnesium carbonate.

According to a most preferred embodiment of the present invention the aqueous solution obtained in step e) comprises:
a calcium hydrogen carbonate with a calcium concentration of 45 mg/l, as calcium carbonate, or
a mixture of a calcium and a magnesium hydrogen carbonate with a calcium concentration of 80 to 120 mg/l, as calcium carbonate, and a magnesium concentration of 20 to 30 mg/l, as magnesium carbonate.

A mixture of calcium and a magnesium hydrogen carbonate can be obtained when dolomite, half burned and/or fully burned dolomite containing material is used as the substance comprising the earth alkali carbonate. In the meaning of the present invention burned dolomite comprises calcium oxide (CaO) and magnesium oxide (MgO), whereas half burnt dolomite comprises Mg in the form of magnesium oxide (MgO) and Ca in the form of calcium carbonate ($CaCO_3$), but can also include some minor amount of calcium oxide (CaO).

In a preferred embodiment of the present invention the process is a continuous process. However, the process of the present invention can also be carried out in a semi-batch mode. In this case, the resulting suspension S can, for example, represent a total particle surface area ($SSA_{total}$) that is around 1 000 000 $m^2$/tonne and is subjected to the process of the present invention. Then, the product, i.e. the aqueous solution of the earth alkali hydrogen carbonate, is discharged from the process until the remaining resulting suspension S represents a total particle surface area ($SSA_{total}$) that is >20 000 $m^2$/tonne, and then a new amount of the at least one substance comprising at least one earth alkali carbonate and the optional at least one earth alkali hydroxide in a minor amount in respect to the earth alkali carbonate is introduced into the process. It is noted that the total particle surface can be determined during each point of the continuous process by determining the specific surface area (SSA) of the suspension S as well as the dry content of the suspension S.

Most preferably, the continuous process is controlled by the amount of discharged aqueous solution comprising at least one earth alkali hydrogen carbonate and the measurement of the solid content of suspension S or by complexometric titration or by measurement of the conductivity of the earth alkali hydrogen carbonate solution.

In yet another embodiment of the present invention the filtering device of step e) is a membrane filter, such as for example a microfiltration and/or an ultrafiltration membrane. In a preferred embodiment, the filtering device of step e) is a tube membrane filter with a pore size of between 0.02 µm and 0.5 µm, and preferably of between 0.05 and 0.2 µm. Preferred are platy and/or tube filters. The tube filters have preferably an inner tube diameter of 0.1 to 10 mm, and more preferably of 0.1 to 5 mm. In a preferred form the membranes are of sintered material, porous porcelain or synthetic polymers, such as polyethylene, Teflon® or the like.

A further object of the present invention is the use of an aqueous solution comprising at least one earth alkali hydrogen carbonate obtained by the inventive process for the production of a precipitated earth alkali carbonate and/or hydromagnesite, and in particular for the production of a precipitated calcium carbonate and/or hydromagnesite. Such precipitated earth alkali carbonates, and in particular a precipitated calcium carbonate and hydromagnesite are useful as fillers in many industrial applications, for example as fillers in paper, paint or plastic.

Another object of the present invention is the use of an aqueous solution comprising at least one earth alkali hydrogen carbonate obtained by the inventive process for the mineralization of water.

A further object of the present invention is a process for the mineralization of water comprising the following steps:
I) providing feed water, II) providing an aqueous solution comprising at least one earth alkali hydrogen carbonate, and III) combining the feed water of step I) and the aqueous solution comprising at least one earth alkali hydrogen carbonate of step II) in order to obtain mineralized water.

According to one embodiment of the process for the mineralization of water the aqueous solution comprising at least one earth alkali hydrogen carbonate of step II) has a hardness that is at least 3° dH, and preferably at least 5° dH higher than the hardness of the feed water of step I).

According to a preferred embodiment the aqueous solution comprising at least one earth alkali hydrogen carbonate of step II) has a hardness of at least 15° dH.

According to another embodiment of the process for the mineralization of water the mineralized water has a calcium concentration, as calcium carbonate, from 1 to 700 mg/l, preferably from 50 to 650 mg/l, and most preferably from 70 to 630 mg/l. According to yet another embodiment of the process for the mineralization of water the mineralized water has a magnesium concentration, as magnesium carbonate, from 1 to 200 mg/l, preferably from 2 to 150 mg/l, and most preferably from 3 to 125 mg/l.

An even further object of the present invention is a process for the production of a precipitated earth alkali carbonate, the process comprising the following steps:
IV) providing an aqueous solution comprising at least one earth alkali hydrogen carbonate, and
V) heating the aqueous solution comprising at least one earth alkali hydrogen carbonate of step IV) in order to obtain the precipitated earth alkali carbonate, and/or
VII) adding at least one earth alkali hydroxide or earth alkali oxide to the solution of step IV) to obtain the precipitated earth alkali carbonate.

By heating the aqueous solution comprising at least one earth alkali hydrogen carbonate, water is evaporated from the solution and upon a certain point of time the earth alkali carbonate starts to precipitate out of the solution.

According to a preferred embodiment of the process for the production of a precipitate earth alkali carbonate, the precipitated earth alkali carbonate is selected from among an amorphous earth alkali carbonate, such as amorphous calcium carbonate or magnesium carbonate, crystalline calcium carbonate in the calcitic, the aragonitic or the vateritic form, magnesite and hydromagnesite, or is a mixture of the aforementioned.

"Conductivity" in the meaning of the present invention is used as an inverse indicator of how salt-free, ion-free, or impurity-free the measured water is; the purer the water, the lower the conductivity. The conductivity can be measured with a conductivity meter and is specified in S/m.

"Ground calcium carbonate (GCC)" in the meaning of the present invention is a calcium carbonate obtained from natural sources including marble, chalk or limestone, and processed through a treatment such as grinding, screening and/or fractionizing by wet and/or dry, for example, by a cyclone.

"Precipitated calcium carbonate (PCC)" in the meaning of the present invention is a synthesized material, generally obtained by precipitation following the reaction of carbon dioxide and lime in an aqueous environment or by precipitation of a calcium and carbonate source in water or by precipitation of calcium and carbonate ions, for example $CaCl_2$ and $Na_2CO_3$, out of solution. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or worm-like forms.

Throughout the present document, the "particle size" of a calcium carbonate product is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. These values were measured using a Mastersizer 2000 device from the company Malvern Instruments GmbH, Germany.

The term "mineralization" as used in the present invention refers to the increase of essential mineral ions in water not containing minerals at all or in insufficient amount to obtain water that is palatable. A mineralization can be achieved by adding at least calcium carbonate to the water to be treated. Optionally, e.g., for health-related benefits or to ensure the appropriate intake of some other essential mineral ions and trace elements, further substances may be mixed to the calcium carbonate and then added to the water during the remineralization process. According to the national guidelines on human health and drinking water quality, the remineralized product may comprise additional minerals containing magnesium, potassium or sodium, e.g., magnesium carbonate, magnesium sulfate, potassium hydrogen carbonate, sodium hydrogen carbonate or other minerals containing essential trace elements.

Useful substances for the use in the inventive process for preparing an aqueous solution comprising at least one earth alkali hydrogen carbonate are natural calcium and/or magnesium carbonate containing inorganic substances or salts, or synthetic calcium and/or magnesium carbonate containing inorganic substances or salts.

Useful natural occurring inorganic substances are for example marble, limestone, chalk, dolomitic marble and/or dolomite. Synthetic substances are for example precipitated calcium carbonates in the calcitic, aragonitic and/or vateritic crystalline form. However, natural occurring inorganic substances are preferred because they inherently contain some essential trace elements.

"Turbidity" in the meaning of the present invention describes the cloudiness or haziness of a fluid caused by individual particles (suspended solids) that are generally invisible to the naked eye. The measurement of turbidity is a key test of water quality and can be carried out with a nephelometer. The units of turbidity from a calibrated nephelometer as used in the present invention are specified as Nephelometric Turbidity Units (NTU).

The inventive process for the preparation of an aqueous solution comprising at least one earth alkali hydrogen carbonate comprises the steps of: a) providing water, b) providing at least one substance comprising at least one earth alkali carbonate and optionally at least one earth alkali hydroxide in a minor amount in respect to the earth alkali carbonate, the at least one substance being in a dry form or in an aqueous form, c) providing $CO_2$, d) combining either: (i) the water of step a), the at least one substance comprising at least one earth alkali carbonate and the optional at least one earth alkali hydroxide of step b) and the $CO_2$ of step c), or (ii) the water of step a) and the at least one substance comprising at least one earth carbonate and the optional at least one earth alkali hydroxide of step b) in order to obtain an alkaline aqueous suspension of the at least one substance comprising at least one earth alkali carbonate and the optional at least one earth alkali hydroxide, and subsequently combining the alkaline aqueous suspension with the $CO_2$ of step c) in order to obtain a resulting suspension S having a pH of between 6 and 9, the resulting suspension S containing particles, e) filtering at least a part of the resulting suspension S that is obtained in step d) by passing the resulting suspension S through a filtering device in order to obtain the aqueous solution comprising at least one earth alkali hydrogen carbonate, wherein the particles of the resulting suspension S that is obtained in step d) represent a total particle surface area ($SSA_{total}$) that is >20 000 $m^2$/tonne of the resulting suspension S, and with the proviso that an addition of the $CO_2$ of step c) does not take place before an addition of the at least one substance comprising at least one earth alkali carbonate and the optional at least one earth alkali hydroxide of step b).

The process according to the present invention is preferably carried out in a reactor system that comprises at least a tank, at least one filtering device, and means connecting the tank and the at least one filtering device, such as pipes or tubes. In addition, the reactor system can also comprise measurement equipment, such as pressure, temperature, pH, turbidity measuring units, and the like.

The tank is equipped with a stirrer, at least one inlet for the water, the carbon dioxide and the substance comprising at least one earth alkali carbonate and the optional at least one earth alkali hydroxide. Connected to the tank, there is also a filtering device where at least a part of the resulting suspension S having a pH of between 6 and 9 and that is prepared in the tank is passed through in order to obtain the aqueous solution comprising at least one earth alkali hydrogen carbonate.

Preferably at least a part of the solution leaving the filtering device is collected in order to obtain the aqueous solution comprising at least one earth alkali hydrogen carbonate. However, if the observed turbidity value of the aqueous solution comprising at least one earth alkali hydrogen carbonate that exits the filtering device is found to be above 1.0 NTU, then the aqueous solution comprising at least one earth alkali hydrogen carbonate is re-circulated in the reactor.

The water that can be used in the inventive process can be derived from various sources. The water preferably treated by the process of the present invention is desalinated seawater, brackish water or brine, treated wastewater or natural water such as ground water, surface water or rainfall.

According to another exemplary embodiment of the present invention, sea water or brackish water is firstly pumped out of the sea by open ocean intakes or subsurface intakes such as wells, and then it undergoes physical pretreatments such as screening, sedimentation or sand removal process. Depending on the required water quality, additional treatment steps such as coagulation and flocculation may be necessary in order to reduce potential fouling on the membranes. The pretreated seawater or brackish water may then be distilled, e.g., using multiple stage flash, multiple effect distillation, or membrane filtration such as ultrafiltration or reverse osmosis, to remove the remaining particulates and dissolved substances.

A flow control valve or other means may be used to control the rate of flow of carbon dioxide into the stream. For example, a $CO_2$ dosing block and a $CO_2$ in-line measuring device may be used to control the rate of the $CO_2$ flow. According to one exemplary embodiment of the invention, the $CO_2$ is injected using a combined unit comprising a $CO_2$ dosing unit, a static mixer and an in-line $CO_2$ measuring device.

The carbon dioxide dose is preferably controlled by the pH of the produced aqueous earth alkali hydrogen carbonate solution.

The alkaline aqueous suspension formed in the reactor system has a solids content in the range from 0.1 to 80 wt.-%, preferably in the range of 3 to 50 wt.-%, more preferably in the range of 5 to 35 wt.-%, based on the total weight of the resulting suspension S.

The substance comprising at least one earth alkali carbonate and the optional at least one earth alkali hydroxide that is dosed into the tank can be in a dry form or in an aqueous form. Preferably, the substance comprising at least one earth alkali carbonate and the optional at least one earth alkali hydroxide has a weight median particle size ($d_{50}$) in the range of 0.1 μm to 50 μm, and preferably in the range of 0.5 μm to 5 μm. According to one embodiment of the present invention, the substance comprising at least one earth alkali carbonate is preferably a ground calcium carbonate (GCC) such as marble, limestone or chalk; or a dolomite.

According to another embodiment of the present invention, the substance comprising at least one earth alkali carbonate and the optional at least one earth alkali hydroxide has a HCl insoluble content from 0.02 to 90 wt.-%, preferably from 0.05 to 15 wt.-%, based on the total weight of the dry substance. The HCl insoluble content may be, e.g., minerals such as quartz, silicate, mica and/or pyrite.

According to yet another embodiment of the present invention, the aqueous suspension of the at least one substance comprising at least one earth alkali carbonate and the optional at least one earth alkali hydroxide in a minor amount in respect to earth alkali carbonate, is freshly prepared by mixing the water and the substance comprising at least one earth alkali carbonate and the optional at least one earth alkali hydroxide in a minor amount in respect to earth alkali carbonate. The on-site preparation of the aqueous suspension may be preferred since premixed the aqueous suspensions may require the addition of further agents such as stabilizers or biocides, which may be unwanted compounds in the remineralized water. According to one preferred embodiment of the present invention, the time period between the preparation of the aqueous suspension and the injection of the aqueous suspension is short enough to avoid bacterial growth in the aqueous suspension. According to one exemplary embodiment, the time period between the preparation of the aqueous suspension and the injection of the aqueous suspension is less than 48 hours, less than 24 hours, less than 12 hours, less than 5 hours, less than 2 hours or less than 1 hour. According to another embodiment of the present invention, the injected aqueous suspension meets the microbiological quality requirements specified by the national guidelines for drinking water.

The aqueous suspension of the at least one substance comprising at least one earth alkali carbonate and the optional at least one earth alkali hydroxide in a minor amount in respect to earth alkali carbonate can be prepared, for example, using a mixer such as a mechanical stirrer for dilute slurries, or a specific powder-liquid mixing device for more concentrate slurries. Depending on the concentration of the prepared aqueous suspension the mixing time may be from 0.5 to 30 min, from 1 to 20 min, from 2 to 10 min, or from 3 to 5 min. According to one embodiment of the present invention, the aqueous suspension is prepared using a mixing machine, wherein the mixing machine enables simultaneous mixing and dosing of the aqueous suspension.

The water used to prepare the aqueous suspension can be, e.g., distilled water, feed water or industrial water. According to one preferred embodiment of the present invention, the water used to prepare the aqueous suspension is feed water, e.g. permeate or distillate obtained from a desalination process.

According to one embodiment the aqueous solution comprising at least one earth alkali hydrogen carbonate is injected directly into a stream of feed water. For example, a clear solution comprising earth alkali hydrogen carbonate can be injected into the feed water stream at a controlled rate by means of a continuous conductivity measurement.

According to one embodiment, the predetermined parameter value is a pH value, wherein the pH value is from 6.5 to 9, preferably from 7 to 8.

Figure 1:
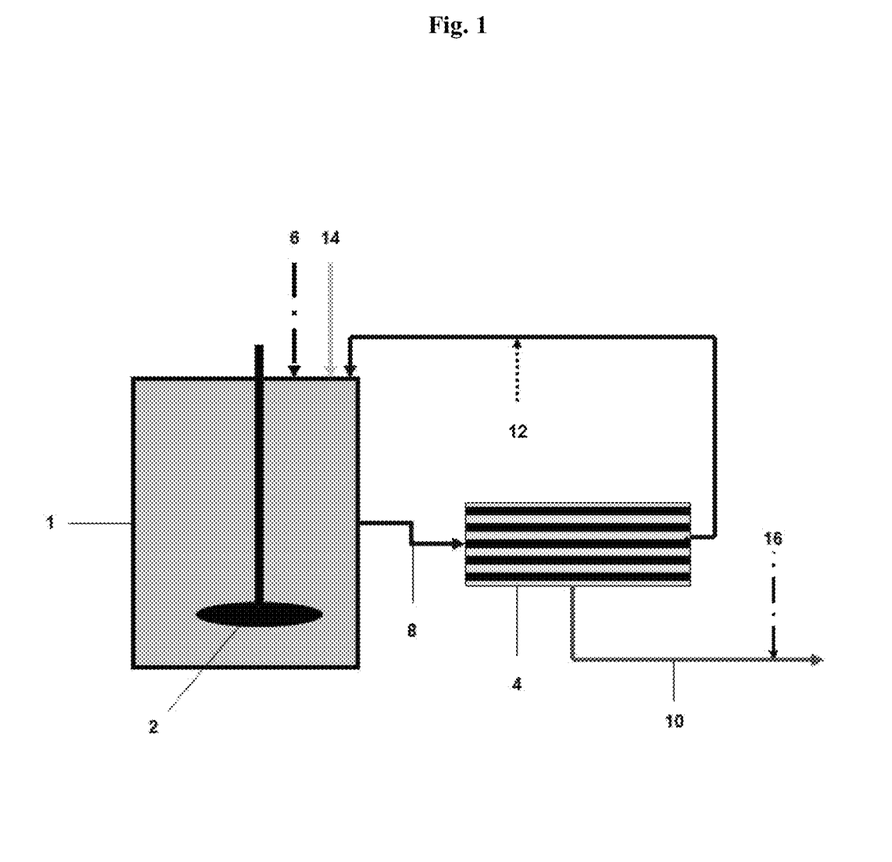
Figure 2:
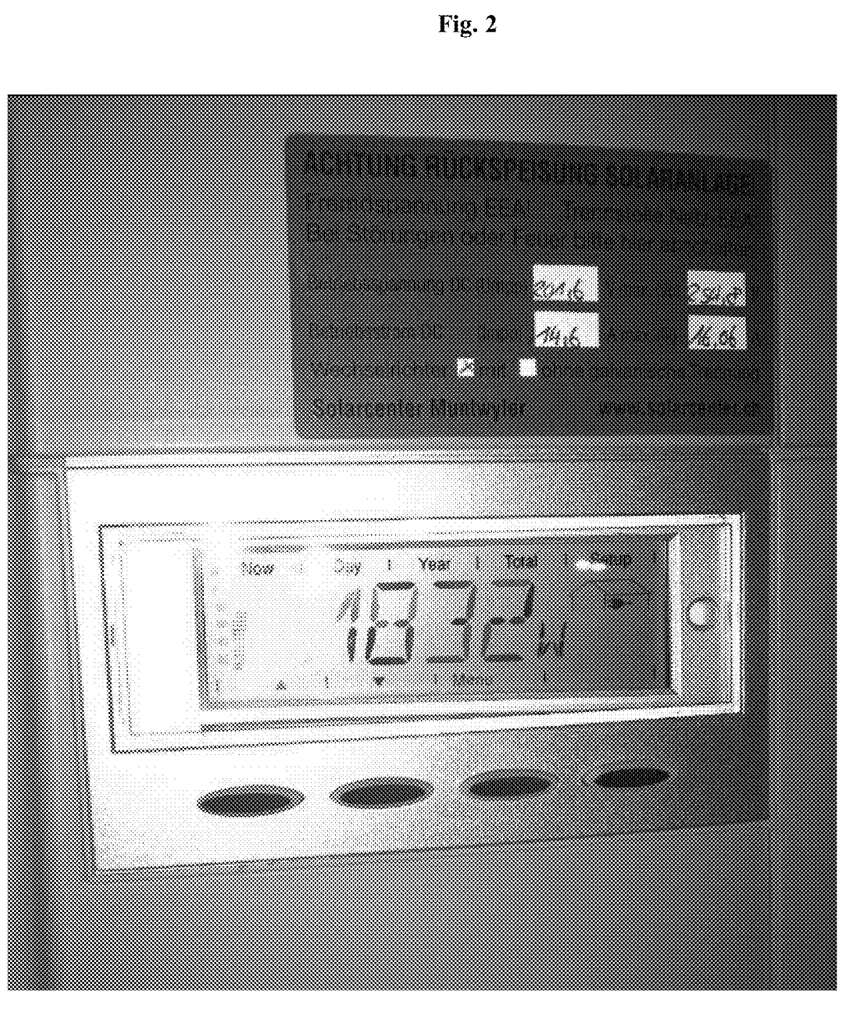

FIG. 1 is meant to illustrate the process according to the present invention.

FIG. 1 exemplifies one embodiment of the present invention. The process according to the present invention is preferably carried out in a reactor system that comprises a tank (1) that is equipped with a stirrer (2), at least one inlet (not shown) for the water, the carbon dioxide and the at least one substance comprising at least one earth alkali carbonate and the optional at least one earth alkali hydroxide as well as a pH measuring device (not shown). The at least one substance comprising at least one earth alkali carbonate and the optional at least one earth alkali hydroxide in a minor amount in respect to earth alkali carbonate can be introduced into the tank either in a dry or in an aqueous form. Connected to the reactor, there is at least one filtering device (4) that has an outlet for the aqueous solution comprising at least one earth alkali hydrogen carbonate. When there is more than one filtering device present, then they can be either arranged in a parallel, or an in-line (serial), or a parallel and an in-line manner. The filtering device (4) is preferably a membrane filter. The filtering device (4) is connected to the tank (1) in such a way that a recirculation of a part of the suspension from the filtering device (4) into the tank (1) is possible, if required. The at least one substance comprising at least one earth alkali carbonate and the optional at least one earth alkali hydroxide (6) in a minor amount in respect to earth alkali carbonate, the water (14) and the $CO_2$ are introduced into the tank (1) via the at least one inlet (not shown) and are stirred with stirrer (2) in order to obtain the resulting suspension S having a pH of between 6 and 9. Then, the resulting suspension S is fed (8) to the filtering device (4), where coarse particles, i.e. all particles having a size of at least 0.2 μm, that are contained in the suspension are retained in the filtering device (4), and a clear aqueous solution comprising at least one earth alkali hydrogen carbonate is obtained. At least a part of the clear aqueous solution comprising at least one earth alkali hydrogen carbonate is discharged (10) from the filtering device (4).

The flow rate of the suspension S through the filtering device (4) is at least 1 m/s, and preferably in the range of 1.5 to 10 m/s, and most preferably in the range of 3 to 6 m/s.

Optionally, further treatments (16) can be carried out, such as for example a mechanical treatment or the addition of biocides or other additives in order to change the pH of the solution (e.g. addition of a base such as NaOH), the conductivity of the solution, or the hardness of the solution. As a further option, the clear aqueous solution comprising at least one earth alkali hydrogen carbonate discharged from the filtering device can be diluted with further water (14). The coarse particles contained in the suspension and that are retained in the filtering device can optionally be recirculated (12) to the reactor in order to be available for further conversion.

According to one embodiment the flow rate of the feed water is 20 000 to 500 000 m³ per day.

The inventive process may be used to produce drinking water, recreation water such as water for swimming pools, industrial water for process applications, irrigation water, or water for the production of purified earth alkali carbonates.

According to one embodiment the earth alkali hydrogen carbonate solution obtained by the inventive process has a calcium concentration from 1 to 700 mg/l, as $CaCO_3$, preferably from 50 to 650 mg/l, as $CaCO_3$, and most preferred from 70 to 630 mg/l, as $CaCO_3$. In case the slurry comprises a further magnesium salt such as magnesium hydrogen carbonate, or magnesium sulfate, the earth alkali hydrogen carbonate solution obtained by the inventive process may have a magnesium concentration from 1 to 200 mg/l, as $MgCO_3$, preferably from 2 to 150 mg/l, as $MgCO_3$, and most preferably from 3 to 125 mg/l, as $MgCO_3$.

According to one embodiment of the present invention the earth alkali hydrogen carbonate solution has a turbidity of lower than 1.0 NTU, preferred lower than 0.3 NTU.

EXAMPLES

Specific Surface Area (SSA) of a Material

The specific surface area (SSA) was measured using a Malvern Mastersizer 2000 (based on the Fraunhofer equation).

Particle size distribution (mass % particles with a diameter<X) and weight median diameter ($d_{50}$) of a particulate material Weight median grain diameter and grain diameter mass distribution of a particulate material were determined using a Malvern Mastersizer 2000 (based on the Fraunhofer equation).

pH of an Aqueous Suspension

The pH was measured using a Mettler-Toledo pH meter. The calibration of the pH electrode was performed using standards of pH values 4.01, 7.00 and 9.21.

Solids Content of an Aqueous Suspension

The suspension solids content (also known as "dry weight") was determined using a Moisture Analyser HR73 from the company Mettler-Toledo, Switzerland, with the following settings: temperature of 120° C., automatic switch off 3, standard drying, 5 to 20 g of suspension.

Turbidity

The turbidity was measured with a Hach Lange 2100AN IS Laboratory Turbidimeter and the calibration was performed using StabCal turbidity standards (formazine standards) of <0.1, 20, 200, 1000, 4000 and 7500 NTU.

Determination of the Hardness (German Hardness; Expressed in "° dH")

The hardness refers to the total amount of earth alkali ions in the aqueous solution comprising the earth alkali hydrogen carbonate, and it is measured by complexometric titration using ethylene-diamine-tetra-actetic acid (EDTA; trade name Titriplex III) and Eriochrome T as equivalent point indicator.

EDTA (chelating agent) forms with the ions $Ca^{2+}$ and $Mg^{2+}$ soluble, stable chelate complexes. 2 ml of a 25% ammonia solution, an ammonia/ammonium acetate buffer (pH 10) and Eriochrome black T indicator were added to 100 ml of a water sample to be tested. The indicator and the buffer is usually available as so-called "indicator-buffer tablet". The indicator, when masked with a yellow dye, forms a red colored complex with the $Ca^{2+}$ and $Mg^{2+}$ ions. At the end of the titration, that is when all ions are bound by the chelating agent, the remaining Eriochrome black T indicator is in its free form which shows a green color. When the indicator is not masked, then the color changes from magenta to blue. The total hardness can be calculated from the amount of EDTA that has been used.

The table below shows a conversion for the different units of the water hardness.

The carbon dioxide used in the examples is commercially available as "Kohlendioxid 3.0" from PanGas, Dagmarsellen, Switzerland. The purity was ≥99.9 Vol.-%.

EXAMPLES

The Prior Art Examples were Prepared in the Following Way

The prior art examples show different slurries with various concentrations of calcium carbonate which were prepared from different carbonate rocks and dosed to feed water in a batch mode.

The feed water was obtained from a reverse osmosis desalination process and was acidified with about 50 mg/l $CO_2$. The slurries were prepared by mixing an appropriate amount of calcium carbonate with 100 ml feed water at room temperature using a magnetic stirrer, with stirring between 1000 and 1500 rpm and a mixing time of between 3 and 5 min.

The remineralization was performed by adding the slurry in small amounts to about one liter of the acidified feed water, wherein the slurry and the feed water were mixed using a magnetic stirrer, with stirring between 1000 and 1500 rpm and a mixing time of 2 minutes. After every slurry addition, a sample was taken from the treated feed water to control the alkalinity, turbidity, conductivity, pH, temperature. A final calcium concentration of 125 mg/l as $CaCO_3$ was chosen as target for remineralization of the feed water. 125 mg $CaCO_3$/l represent a concentration of 0.0125 wt.-%. For each sample the turbidity of the remineralized water was measured directly after mixing and after a settling period of minimum 60 minutes. The turbidity measured on the settled samples was performed in order to observe the impact of sedimentation in the remineralization process.

The turbidity was measured with a Hach Lange 2100AN IS Laboratory Turbidimeter and the calibration was performed using StabCal turbidity standards (formazin standards) of <0.1, 20, 200, 1000, 4000 and 7500 NTU.

The total alkalinity was measured with a Mettler-Toledo T70 Titrator using the related LabX Light Titration software. A DGi111-SG pH electrode was used for this titration according to the corresponding Mettler-Toledo method M415 of the application brochure 37 (water analysis). The calibration of the pH electrode was performed using Mettler-Toledo standards of pH values 4.01, 7.00 and 9.21.

Example 1—Slurry A

Two slurries having a calcium carbonate concentration of 0.5 and 5 wt.-% based on the total weight of the slurry were prepared from marble (Salses, France) derived micronized calcium carbonate having a medium particle size of 3.5 μm

| Conversion for the different units of the water hardness[1] | | ° dH | ° e | ° fH | ppm | mval/l | mmol/l |
|---|---|---|---|---|---|---|---|
| German Hardness | 1° dH = | 1 | 1.253 | 1.78 | 17.8 | 0.357 | 0.1783 |
| English Hardness | 1° e = | 0.798 | 1 | 1.43 | 14.3 | 0.285 | 0.142 |
| French Hardness | 1° fH = | 0.560 | 0.702 | 1 | 10 | 0.2 | 0.1 |
| ppm $CaCO_3$ (USA) | 1 ppm = | 0.056 | 0.07 | 0.1 | 1 | 0.02 | 0.01 |
| mval/l Earth alkali ions | 1 mval/l = | 2.8 | 3.51 | 5 | 50 | 1 | 0.50 |
| mmol/l Earth alkali ions | 1 mmol/l = | 5.6 | 7.02 | 10.00 | 100.0 | 2.00 | 1 |

[1] In this regard the unit ppm is used in the meaning of 1 mg/l $CaCO_3$.

and a HCl insoluble content of 0.2 wt.-% based on the total weight of the calcium carbonate.

The results compiled in Table 1 show similar turbidity values for both remineralization processes with 0.5 wt.-% and 5 wt.-% $CaCO_3$ slurries. After a settling period, the samples presented turbidity values lower than 0.5 NTU.

Example 2—Slurry B

Three slurries having a calcium carbonate concentration of 0.5, 1 and 10 wt.-% based on the total weight of the slurry were prepared from marble (Bathurst, Australia) derived micronized calcium carbonate having a medium particle size of 2.8 µm and a HCl insoluble content of 1.5 wt.-% based on the total weight of the calcium carbonate.

The results compiled in Table 1 show similar turbidity values for all three remineralization processes. However the turbidity values measured for the settled samples taken after two minutes of remineralization are higher than those of example 1, which may be due to the difference in the HCl insoluble content of the marble calcium carbonate.

Example 3—Slurry C

A slurry having a calcium carbonate concentration of 5 wt.-% based on the total weight of the slurry was prepared from limestone (Orgon, France) derived micronized calcium carbonate having a medium particle size of 3 µm, a specific surface area (SSA) of 2.6 m²/g, and a HCl insoluble content of 0.1 wt.-% based on the total weight of the calcium carbonate.

The results compiled in Table 1 show that the turbidity value measured for the settled sample is much lower in comparison to the values of example 1 and 2, which may be due to the different geological structures of the carbonate rocks.

TABLE 1

| Slurry | Slurry concentration (wt.-%) | Turbidity (NTU) Fresh sample | Turbidity (NTU) Settled sample | Alkalinity fresh sample (mg/l $CaCO_3$) |
|---|---|---|---|---|
| A | 0.5 | 35 | 0.44 | 100 |
| A | 5.0 | 32 | 0.45 | 120 |
| B | 0.5 | 26 | 3.90 | 115 |
| B | 1.0 | 25 | 3.50 | 112 |
| B | 10.0 | 24 | 3.30 | 119 |
| C | 5.0 | 20 | 0.21 | 117 |

The results compiled in Table 1 show a strong turbidity of the fresh samples and for most of the samples even after settlement.

Example 4—Different Particle Sizes

Three slurries having a calcium carbonate concentration of 5 wt.-% based on the total weight of the slurry were prepared from marble derived micronized calcium carbonate having a particle size of 3.5, 9, and 20 µm, respectively, and a HCl insoluble content of 0.2 wt.-% based on the total weight of the calcium carbonate.

The results compiled in Table 2 show that after a settling period the turbidity of the water remineralized with a larger particle size, i.e. 20 µm, has a lower turbidity value in comparison with the turbidity of the water remineralized with smaller particle size, i.e. 3.5 µm what is logic due to the fact that the coarse particles settled much faster versus fine particles.

TABLE 2

| Mean particle size (µm) SSA (m²/g) SSA (m²/m³) | Turbidity (NTU) Fresh sample | Turbidity (NTU) Settled sample | Alkalinity fresh sample (mg/l $CaCO_3$) |
|---|---|---|---|
| 3.5 2.61 326 | 32 | 0.45 | 120 |
| 9 1.75 219 | 22 | 0.36 | 78 |
| 20 0.94 118 | 27 | 0.31 | 67 |

The results compiled in Table 2 show a strong turbidity for the fresh samples. After a settling period the water that was remineralized with a larger particle size, i.e. 20 µm, shows a lower turbidity value compared to the water that was remineralized with a smaller particle size, i.e. 3.5 µm, what is somehow logic due to the fact that coarse particles settle much faster than fine ones, but which will increase the turbidity of the sample immediately if the sample is shaken.

Marble based calcium carbonate having a weight median diameter ($d_{50}$) of 3.5 µm represents approximately a total particle surface of 2.61 m²/g corresponding to 326.3 m²/tonne of suspension at 0.0125 wt.-% solids.

Marble based calcium carbonate having a weight median diameter ($d_{50}$) of 9 µm represents approximately a total particle surface of 1.75 m²/g corresponding to 218.8 m²/tonne of suspension at 0.0125 wt.-% solids.

Marble based calcium carbonate having a weight median diameter ($d_{50}$) of 20 µm represents approximately a total particle surface of 0.94 m²/g corresponding to 117.5 m²/tonne of suspension at 0.0125 wt.-% solids.

It can be derived from the above information that the dissolution rate of calcium carbonate is reduced by the reduced specific surface of the calcium carbonate particles that are present in the suspension.

Examples Relating to the Invention

A general process flow sheet of the process according to the present invention is shown in FIG. 1.

The feed water used in the inventive examples was obtained from an ion exchange equipment of Christ, Aesch, Switzerland Typ Elite 1BTH, the feed water having the following water specification after the ion exchanger:

| Sodium | 169 mg/l |
|---|---|
| Calcium | 2 mg/l |
| Magnesium | <1 mg/l |
| ° dH | 0.3 |

The following different process routes were used to exemplify the process according to the present invention:
Process A (FIG. 1) The suspension of the reactor passes a mill without grinding beads in the mill. This process is sought to exemplify the embodiment of the invention.

Example 5, Microdol A Extra (Dolomite)

In the present example, Microdol A extra a dolomite obtained from the Company Norwegian Talc, Knarrevik, was used as the at least one earth alkali carbonate. The reaction and the operation conditions are given in Table 3. Process A, 23° C. (Tank Temperature)

TABLE 3

| Feed solids wt.-% | $CO_2$ ml/min g/h Mol/h | ° dH Permeate | l/h of Permeate | l/h of Permeate at 10° dH Mol $CaCO_3$/h | Membrane pressure | l/h/m² Permeate at 10° dH | pH permeate | $d_{10}$ $d_{50}$ $d_{90}$ SSA |
|---|---|---|---|---|---|---|---|---|
| 15 | 100 11.8 0.268 | 25 | 63 | 158 0.282 | 1 | 264 | 7.4 | 0.35 μm 2.67 μm 10.23 μm 2.24 m²/g |
| 15 | 150 17.7 | 30 | 55 | 165 | 1.5 | 276 | 7.35 | |
| 15 | 200 23.6 | 32 | 51 | 162 | 1.5 | 270 | 7.25 | |
| 15 | 200 23.6 | 32.5 | 47 | 151 | 2 | 252 | 7.14 | |

The total mineral surface of the particles in the suspension of this trial represents 336 000 m²/tonne of suspension.

The ratio of produced mol $CaCO_3$ to used mol $CO_2$ in this example is 1:0.54

Example 6, Marble

In the present example, a marble sold under the trade name "Omyacarb 10 AV" from the company Omya International, Switzerland, was used as the earth alkali carbonate. The HCL insoluble content was 0.7 wt.-%. The reaction and the operation conditions are given in Table 4.

Process A, 27° C. (Tank Temperature)

TABLE 4

| Feed solids wt.-% | $CO_2$ ml/min g/h Mol/h | ° dH Permeate | l/h of Permeate | l/h of Permeate at 10° dH Mol $CaCO_3$/h | Membrane pressure | l/h/m² Permeate at 10° dH | pH permeate | $d_{10}$ $d_{50}$ $d_{90}$ SSA |
|---|---|---|---|---|---|---|---|---|
| 15 | 50 5.9 0.134 | 32.5 | 35 | 115 0.205 | 1.5 | 192 | 6.55 | 0.48 μm 5.42 μm 16.98 μm 1.52 m²/g |

The total mineral surface of the particles in the suspension of this trial represents 228 000 m²/tonne of suspension.

The ratio of produced mol $CaCO_3$ to used mol $CO_2$ in this example is 1:0.65

Example 7, Marble, Norway

Process A, 20° C. (Tank Temperature)

Fine ground Norwegian marble (Molde, Norway) was dispersed in tap water (3° dH, pH 7.4) at a solids content of 35 wt.-% using 0.72 wt. %, based on dry weight of the marble, of sodium polyphosphate, and 0.21 wt.-% of phosphoric acid to form a suspension. The suspension had a conductivity of 2 580 μS/cm.

The suspension was pumped in circulation mode at a rate of 3200 l/h from the reactor passing a membrane module of 0.2 m² (Microdyn-Modul MD 063 TP 2N) and was then recirculated into the tank. $CO_2$ was dosed after the pump, but before the membrane module.

The pump was driven by a mix of solar electrical power (Solarcenter Muntwiler, Switzerland, www.solarcenter.ch) and nuclear power plant. The solar power station comprises approximately 25 m² of solar panels. The total electrical power used in this trail was 5.5 kWh; the part of solar power was 1.5 kWh. (1.1 to 1.9 kWh).

| Feed solids wt.-% | $CO_2$ ml/min | ° dH Permeate | l/h of Permeate at 10° dH Mol $CaCO_3$/h | Membrane pressure | l/h/m² Permeate at 10° dH | pH permeate | $d_{10}$ $d_{50}$ $d_{90}$ SSA | % Solar power |
|---|---|---|---|---|---|---|---|---|
| 35 | 50 | 13 | 49.8 0.089 | 1 | 249 | 7.1 | 0.33 μm 0.87 μm 1.92 μm 3.40 m²/g | 27% |

The total mineral surface of the particles in the suspension of this trial represents 1 197 385 m²/tonne of suspension.

Example 8, Pilot Scale Trials

This examples presents trials for the preparation of aqueous solutions of calcium hydrogen carbonate in pilot scale. The obtained solution of calcium hydrogen carbonate is then used for the remineralization of soft water, which could be for instance natural soft water from ground water or surface water sources, desalinated water from reverse osmosis or distillation, rain water. The trials were performed using different calcium carbonate products as raw material for the preparation of calcium carbonate suspension, hereafter slurries, and the resulting solutions of calcium hydrogen carbonate obtained after the dosing of carbon dioxide.

The following Table 5 summarizes the properties of the calcium carbonate used during the remineralization pilot trials with an initial slurry volume of 1200 L.

TABLE 5

| Samples[1] | Calcium carbonate rock | $d_{50}$ [µm] | $CaCO_3$ [wt.-%] | HCl insoluble [wt.-%] |
|---|---|---|---|---|
| A | Marble | 13.7 | 96.6 | 0.6 |
| B | Marble | 2.7 | 96.0 | 1.0 |
| C | Limestone | 7.8 | 99.5 | 0.1 |
| D | Limestone | 4.3 | 99.5 | 0.1 |

[1]It has to be noted that all of the above listed calcium carbonates are commercially available from Omya, Switzerland.

The following Table 6 summarizes the properties of the slurries of the calcium carbonate products that have been used for the present trials.

TABLE 6

| | | Starting slurry composition | |
|---|---|---|---|
| Slurry | Product | Target slurry concentration (wt.-%) | Mean particle size (µm) SSA (m²/g) Expected total SSA (m²/t) |
| 1 | A | 2 | 13.7<br>1.3<br>26'600 |
| 2 | B | 2 | 2.7<br>3.9<br>78'000 |
| 3 | C | 2 | 7.8<br>1.7<br>34'800 |
| 4 | D | 7 | 4.3<br>2.3<br>162'400 |

The in Table 6 mentioned calcium carbonate suspensions (or "slurries") were prepared by mixing the micronized calcium carbonate powder and reverse osmosis water (RO water). The RO water was produced on-site using a reverse osmosis unit and had the average quality as outlined in the following Table 7.

TABLE 7

| | pH | Conductivity (µS/cm) | Turbidity (NTU) |
|---|---|---|---|
| RO water | 6.4-6.6 | 10-25 | <0.1 |

The tank was filled up completely with the respective calcium carbonate suspension. Then, the calcium carbonate suspension was pumped from the tank towards the mill (without grinding beads in the mill), and from there to the membrane filtering device for filtration. The mill was used as dosing point for the carbon dioxide that is required for the dissolution of the calcium carbonate into the water. The obtained dissolved hydrogen carbonate then passed through the membrane, while the undissolved calcium carbonate was fed back to the tank. Amongst different water parameters, the conductivity was used as a proxy for measuring the amount of dissolved hydrogen carbonate obtained by this process.

The conditions for the carbon dioxide and calcium carbonate dosing can be derived from Table 8.

TABLE 8

| Concentrate flowrate (L/h) | Target concentration (mg/L as $CaCO_3$) | $CO_2$ flowrate (L/min) | Target $CO_2/CaCO_3$ stoechiometric ratio (x-fold) | $CO_2$/concentrate ratio (L $CO_2$/L concentrate) |
|---|---|---|---|---|
| 500 | 500 | 5 | 5 | 0.6 |

The following Table 9 summarizes the results obtained at the end of full days of testing (6-7 hours per day) over 1 to 3 days of slurry 1 (with a solids content of 2 wt.-% of sample A) and slurry 2 (with a solids content of 2 wt.-% of sample B).

TABLE 9

| | | Start | | Final | | | | |
|---|---|---|---|---|---|---|---|---|
| Test | Slurry | $d_{50}$ start [µm] | Testing days | [slurry]$_f$ | $d_{50f}$ [µm] | $SSA_f$ (m²/g) | total $SSA_f$ (m²/t) | Final conductivity (µS/cm) |
| 1 | Slurry 1 | 13.7 | 2 | 1.2% | 15.8 | 1.1 | 14'124 | 995 |
| 2 | Slurry 1 | 13.7 | 1 | 1.7% | 10.7 | 1.4 | 28'764 | 1060 |
| 3 | Slurry 2 | 2.7 | 3 | 1.7% | 3.4 | 2.3 | 39'100 | 1100 |
| 4 | Slurry 2 | 2.7 | 1 | 1.6% | 3.2 | 3.2 | 61'440 | 1225 |

This set of tests shows that the conductivity is increasing proportionally to the specific surface area, i.e. $SSA_f$ (m$^2$/g), and to the total surface area available in the slurry, i.e. SSA total (m$^2$/t) for a given constant solid content of the slurry, i.e. [slurry]$_f$ of around 2 wt %.

The results presented in Table 10 were performed using the slurry 2 (with a solids content of 2 wt.-% of sample B). The two tests were performed using the same $CO_2$ dosing ratio of 0.3 L $CO_2$/L concentrate and the results presented the values obtained at the end of a full day of testing (6-7 hours) over 1 to 2 days.

TABLE 10

| | Start | | Final | | | |
|---|---|---|---|---|---|---|
| Test | Slurry | d$_{50}$ start [μm] | Testing days | [slurry]$_f$ | SSA$_f$ (m$^2$/g) | total SSA$_f$ (m$^2$/t) | Final conductivity (μS/cm) |
| 5 | Slurry 2 | 2.7 | 2 | 1.9% | 3.0 | 62'700 | 825 |
| 6 | Slurry 2 | 2.7 | 1 | 2.2% | 3.5 | 92'400 | 930 |

The outcome of this set of trials shows that the conductivity is increasing proportionally to the specific surface area, i.e. $SSA_f$ (m$^2$/g) and to the total surface area available in the slurry, i.e. SSA total (m$^2$/t).

Continuous Testing Period

It is believed that the inventive process requires time to reach a steady-state, therefore long testing period have been initiated with a testing period from 10 to 22 days. The surface area of the solids present in the slurry has a direct impact on the dissolution of the calcium carbonate into the water and therefore on the final concentration of the dissolved hydrogen carbonate, measured as final conductivity.

The results presented in Table 11 were performed using two slurries made of different products. The slurry 3 contains the coarser product (Sample C: d$_{50}$=7.8 μm, SSA=1.7 m$^2$/g) and the slurry 4 the finer product (Sample D: d$_{50}$=4.3 μm, SSA=2.3 m$^2$/g). Both slurries have a different the solid content, 2 wt.-% for slurry 3 and 7 wt.-% for slurry 4, respectively. The tests were performed using the same $CO_2$ dosing ratio of 0.3 L $CO_2$/L concentrate and the results present the values obtained at the end of 8 days of testing when the system can be considered to have reached a steady-state.

TABLE 11

| | Start | | Final | | | | |
|---|---|---|---|---|---|---|---|
| Test | Slurry | d$_{50}$ start [μm] | Day of results (d)/ Testing period (d) | [slurry]$_f$ | SSA$_f$ (m$^2$/g) | total SSA$_f$ (m$^2$/t) | Final conductivity (μS/cm) |
| 7 | Slurry 3 | 7.8 | 8/22 | 1.7% | 0.7 | 14'908 | 670 |
| 8 | Slurry 3 | 7.8 | 8/10 | 1.9% | 0.7 | 16'450 | 710 |
| 9 | Slurry 4 | 4.3 | 8/12 | 6.8% | 1.4 | 116'345 | 792 |

The invention claimed is:

1. A process for the mineralization of water comprising the following steps:
   (I) providing feed water,
   (II) providing an aqueous solution comprising at least one earth alkali hydrogen carbonate, and
   (III) combining the feed water of step I) and the aqueous solution comprising at least one earth alkali hydrogen carbonate of step II) in order to obtain mineralized water,
   wherein the aqueous solution comprising at least one earth alkali hydrogen carbonate in step (II) is obtained by the process comprising the steps of:
   a) providing water,
   b) providing at least one substance comprising at least one earth alkali carbonate, the at least one substance being in a dry form or in an aqueous form, wherein the at least one substance is selected from the group consisting of marble, limestone, chalk, dolomite, and precipitated calcium carbonate, and wherein the at least one substance has a specific surface area (SSA) in the range of 0.01 to 200 m$^2$/g, and a weight median particle size (d$_{50}$) in the range of 1.0 μm to 50 μm,
   c) providing CO2,
   d) combining the at least one substance of step b) with the CO2 of step c) in the water of step a) at a temperature in a range of 5 to 55° C. in order to obtain a resulting suspension S having a pH of between 6 and 9, a solids content in the range of 1 to 35 wt.-% based on the total weight of the resulting suspension S, and containing particles that represent a total particle surface area (SSA$_{total}$) that is greater than 20,000 m$^2$/tonne of the resulting suspension S, and
   e) filtering at least a part of the resulting suspension S that is obtained in step d) by passing the resulting suspension S through a filtering device in order to obtain an aqueous solution comprising at least one earth alkali hydrogen carbonate.

2. The process according to claim 1, wherein the particles of the resulting suspension S represent a total particle surface area (SSA$_{total}$) that is in the range of 25,000-2,000,000 m$^2$/tonne of the resulting suspension S.

3. The process according to claim 1, wherein the at least one substance comprising at least one earth alkali carbonate of step b) has a weight median particle size (d$_{50}$) in the range of 0.5 μm to 5 μm.

4. The process according to claim 1, wherein the at least one substance comprising at least one earth alkali carbonate of step b) has a specific surface area (SSA) in the range of 1 to 100 m$^2$/g.

5. The process according to claim 1, wherein the at least one substance comprising at least one earth alkali carbonate of step b) has an HCl insoluble content from 0.05 to 15 wt.-%, based on the total weight of the dry substance.

6. The process according to claim 1, wherein the $CO_2$ of step c) is gaseous carbon dioxide, liquid carbon dioxide, solid carbon dioxide, or a gaseous mixture of carbon dioxide and at least one other gas.

7. The process according to claim 1, wherein the amount of $CO_2$ used, in mol, to produce 1 mol of the at least one earth alkali hydrogen carbonate in the aqueous solution is from 0.5 to 4 mol of $CO_2$.

8. The process according to claim 1, wherein the amount of $CO_2$ used, in mol, to produce 1 mol of the at least one earth alkali hydrogen carbonate in the aqueous solution is from 0.5 to 2.5 mol of $CO_2$.

9. The process according to claim 1, wherein the aqueous solution comprising at least one earth alkali hydrogen carbonate that is obtained in step e) has a hardness from 5 to 130° dH.

10. The process according to claim 1, wherein the aqueous solution comprising at least one earth alkali hydrogen carbonate that is obtained in step e) has a hardness from 10 to 60° dH.

11. The process according to claim 1, wherein the at least one substance comprising at least one earth alkali carbonate is dolomite, and the aqueous solution comprising at least one earth alkali hydrogen carbonate that is obtained in step e) has a magnesium concentration, as magnesium carbonate, from 1 to 200 mg/l.

12. The process according to claim 1, wherein the at least one substance comprising at least one earth alkali carbonate is dolomite, and the aqueous solution comprising at least one earth alkali hydrogen carbonate that is obtained in step e) has a magnesium concentration, as magnesium carbonate, from 2 to 150 mg/l.

13. The process according to claim 1, wherein the aqueous solution comprising at least one earth alkali hydrogen carbonate that is obtained in step e) has a turbidity value of lower than 0.5 NTU.

14. The process according to claim 1, where the aqueous solution comprising at least one earth alkali hydrogen carbonate of step II) has a hardness that is at least 3° dH higher than the hardness of the feed water of step I).

15. The process according to claim 1, where the aqueous solution comprising at least one earth alkali hydrogen carbonate of step II) has a hardness that is at least 5° dH higher than the hardness of the feed water of step I).

16. The process according to claim 1, wherein the aqueous solution comprising at least one earth alkali hydrogen carbonate of step II) has a hardness of at least 15 dH.

17. The process according to claim 1, wherein the at least one substance comprising at least one earth alkali carbonate is marble.

18. The process according to claim 1, wherein the at least one substance comprising at least one earth alkali carbonate is limestone.

19. The process according to claim 1, wherein the at least one substance comprising at least one earth alkali carbonate is chalk.

20. The process according to claim 1, wherein the at least one substance comprising at least one earth alkali carbonate is dolomite selected from dolomitic limestone or calcareous dolomite.

21. The process according to claim 1, wherein the at least one substance comprising at least one earth alkali carbonate is dolomite.

22. The process according to claim 1, wherein the at least one substance comprising at least one earth alkali carbonate is precipitated calcium carbonate.

23. The process according to claim 1, wherein the aqueous solution comprising at least one earth alkali hydrogen carbonate that is obtained in step e) has a turbidity value of lower than 1.0 NTU and has a calcium concentration, as calcium carbonate, from 50 to 650 mg/l.

24. The process according to claim 1, wherein the at least one earth alkali hydrogen carbonate comprises $Mg(HCO_3)_2$ formed in the presence of $Ca(OH)_2$.

25. The process according to claim 1, wherein the aqueous solution comprising at least one earth alkali hydrogen carbonate comprises a calcium concentration of 80 to 120 mg/l as calcium carbonate and a magnesium concentration of 20 to 30 mg/l as magnesium carbonate.

26. The process according to claim 1, wherein the at least one substance comprising at least one earth alkali carbonate is dolomitic limestone or calcareous dolomite limestone.

27. A process for the mineralization of water, the process comprising:
(I) providing feed water,
(II) providing an aqueous solution comprising at least one earth alkali hydrogen carbonate, and
(III) combining the feed water of step I) and the aqueous solution comprising at least one earth alkali hydrogen carbonate of step II) in order to obtain mineralized water,
wherein the aqueous solution comprising at least one earth alkali hydrogen carbonate in step (II) is obtained by a continuous process comprising:
combining at least one substance comprising at least one earth alkali carbonate with $CO_2$ in water at a temperature in a range of 5 to 55° C. to obtain a resulting suspension having a pH of between 6 and 9, a solids content of from 1 to 35 wt.-% based on the total weight of the resulting suspension, and containing particles that represent a total particle surface area ($SSA_{total}$) that is greater than 20,000 m²/tonne of the resulting suspension; and
passing the resulting suspension through a filtering device to obtain the aqueous solution comprising at least one earth alkali hydrogen carbonate;
wherein the at least one substance is selected from the group consisting of marble, limestone, chalk, dolomite, and precipitated calcium carbonate and has a specific surface area (SSA) in the range of 1.0 to 200 m²/g, and a weight median particle size ($d_{50}$) in the range of 0.1 µm to 50 µm.

* * * * *